United States Patent [19]
Morishige

[11] Patent Number: 5,156,572
[45] Date of Patent: Oct. 20, 1992

[54] SPEED SHIFT CONTROL SYSTEM OF A CONTINUOUS TRANSMISSION

[75] Inventor: Chitoshi Morishige, Hiroshima, Japan

[73] Assignee: Mazda Motor Corporation, Hiroshima, Japan

[21] Appl. No.: 626,436

[22] Filed: Dec. 12, 1990

[30] Foreign Application Priority Data

Dec. 18, 1989 [JP] Japan ............... 1-329348

[51] Int. Cl.[5] .............................. F16H 61/04
[52] U.S. Cl. .................... 474/70; 474/11; 474/28; 74/866
[58] Field of Search .............. 474/11, 12, 18, 28, 474/69, 70; 74/866, 867, 868

[56] References Cited

U.S. PATENT DOCUMENTS

| | | | |
|---|---|---|---|
| 4,649,488 | 3/1987 | Osanai | 474/12 |
| 4,702,128 | 10/1987 | Oshiage | 74/866 |
| 4,729,103 | 3/1988 | Oshiage | 74/866 |
| 4,875,892 | 10/1989 | Sueda | |
| 4,893,526 | 1/1990 | Tokoro | 74/866 |
| 4,923,433 | 5/1990 | Tanaka | 474/28 |
| 4,995,283 | 2/1991 | Sawasaki | 74/866 |
| 4,999,774 | 3/1991 | Tokoro | 74/866 |
| 5,060,768 | 10/1991 | Yamoshita | 474/28 |

FOREIGN PATENT DOCUMENTS

63-42146  8/1988  Japan .

Primary Examiner—Renee S. Luebke
Assistant Examiner—F. Saether
Attorney, Agent, or Firm—Sixbey, Friedman, Leedom & Ferguson

[57] ABSTRACT

According to a gear shift control system of a continuous transmission of the present invention, when the gear ratio is controlled to a target gear ratio, a deviation between an actual primary pulley speed and the target primary pulley speed is detected. When a feedback-control is carried out to control the actual primary pulley speed to the target primary pulley speed on the basis of the above deviation, the control gain(s) is changed according to the deviation between the actual and the target primary pulley speeds at changing the gear ratio. Thus, the gear ratio is changed at the constant speed and better gear characteristics can be gained. Moreover, the hunting of the actual primary pulley speed occurred around the target speed can be prevented.

11 Claims, 9 Drawing Sheets

SPEED SHIFT CONTROL SYSTEM OF A CONTINUOUS TRANSMISSION

BACKGROUND OF THE INVENTION

The present invention relates to the improvement of a speed shift control system of a continuous transmission.

As a conventional art for changing the gear ratio of a continuous transmission, for example, the Japanese Patent Publication Gazette No. 63-42146 discloses the known device having a pair of, primary and secondary, pulleys, effective diameter of both pulleys are changable, and a belt coupling the above two pulleys. In this device, each effective diameter of the primary and the secondary pulley is continuously regulated by providing/releasing a hydraulic pressure to/from a hydraulic cylinder of the primary pulley so as to control the gear ratio changeable.

Another art of controlling the gear ratio to a target gear ratio is a feedback-control which controls the primary pulley speed to a target speed. In other words, the target primary pulley speed which corresponds to the target gear ratio is determined first according to the driving status, and the actual primary pulley speed is detected. On the basis of the deviation between the target and the actual primary pulley speeds, a feedback-control value is gained. The effective diameter of the primary pulley is controlled by the feedback-control value so as to make the primary pulley speed to the target primary pulley speed. Thus, the gear ratio is controlled to the target gear ratio.

Figure 10:
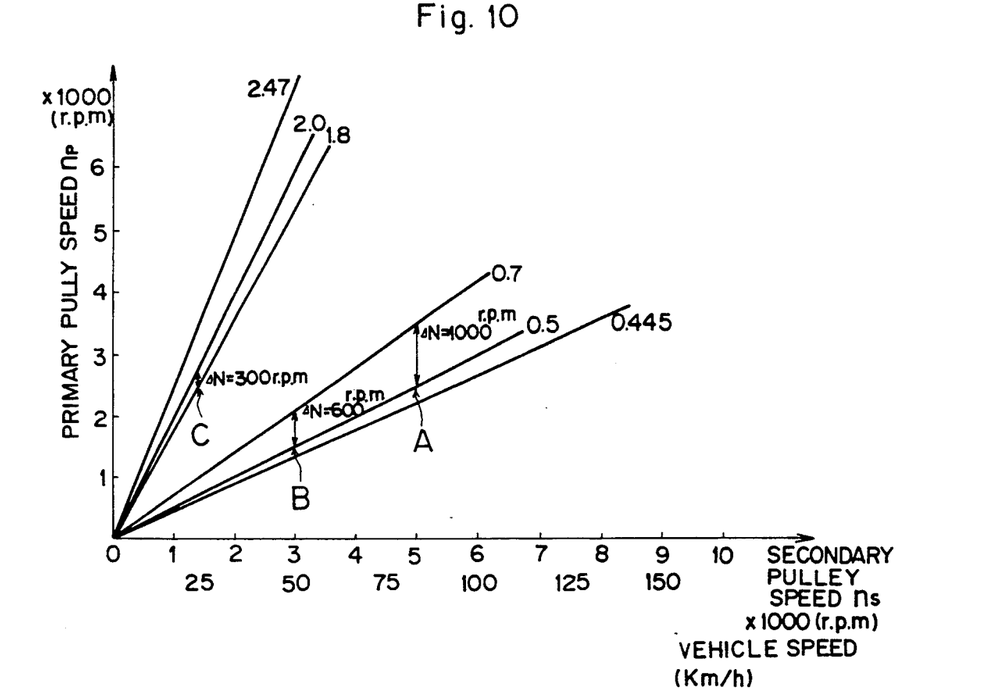
FIG. 10 is a diagram showing a map of pulley speed.

However, the following disadvantages were found in gear ratio control device for a continuous transmission by the conventional art. As shown in FIG. 10, in the gear ratio map of which X axis shows the secondary pulley speed and the vehicle speed and Y axis shows the primary pulley speed, when the gear ratio is, for example, increased from 0.5 to 0.7, at point A in the map, i.e. the secondary pulley speed is 5000 r.p.m and the primary pulley speed is 2500 r.p.m, the deviation between the actual and the target (3500 r.p.m) primary pulley speeds is 1000 r.p.m at 0.7 gear ratio. On the other hand, when the gear ratio is increased from 0.5 to 0.7 as the above example at point B, i.e. the secondary pulley speed is 3000 r.p.m and the primary pulley speed is 1500 r.p.m, the deviation between the actual and the target (2100 r.p.m) primary pulley speed is 600 r.p.m at 0.7 gear ratio, in spite of the gear ratio is increased by 0.2 as the above example. This means that the deviation between the actual and the target speed varies according to the primary pulley speed and the secondary pulley speed even the gear ratio is changed by the same amount. The above example can be applied to the case having changed the gear ratio by the same amount at different gear ratio. For example, when the gear ratio is changed from 1.8 to 2.0, the gear ratio is changed by the same amount, 0.2, as the above example, from 0.5 to 0.7. However, when gear ratio is changed at point C having the same primary pulley speed (2500 r.p.m) as the point A and the secondary pulley speed is about 1400 r.p.m, the deviation between the actual and the target (2800 r.p.m) primary pulley speed is 300 r.p.m which is greatly different from the deviation 1000 r.p.m at point A. Thus, when gear ratio is changed, the deviation varies depending on the primary pulley speed and the secondary pulley speed. Since the feedback-control value is determined in such a way that the speed deviation is multiplied by the control gain, the greater deviation results in the greater feedback-control value and consequently, speed for changing the gear ratio will be faster even the gear ratio is changed by the same amount. On the other hand, the lesser speed deviation results in the lesser feedback-control value and consequently, speed for changing the gear ratio will be slower. Thus, different control gains are obtained at each gear ratio change and the speed differs at each gear ratio change. As a result, different speed response is gained at each gear change and accordingly, a problem will be caused in driving a vehicle.

The object of the present invention is to maintain the constant speed for changing the gear ratio at all times in spite of the primary pulley speed and the secondary pulley speed.

To achieve the above object, when the same amount of gear ratio is changed, the feedback-control value is kept equal by changing the control gain according to the speed deviation which varies depending on the primary and the secondary pulley speeds.

Concretely, according to the present invention, the continuous transmission comprises a pair of, first and secondary, pulleys having the changeable effective diameters, a belt coupling both pulleys, and regulator means for regulating the effective diameters of the primary and the secondary pulleys. Also, it comprises target speed determining means for determining a target primary pulley speed corresponding to a target gear ratio varying depending on the driving status, speed detecting means for detecting an actual primary pulley speed, and control means which receive outputs from the target speed determining means and the speed detecting means and feedback-controls the regulator means for controlling the primary pulley speed to the target primary pulley speed on the basis of the deviation between the actual and the target primary pulley speeds. Moreover, it comprises control gain changing means which changes the control gain of the above control means according to the size of the deviation of the actual and the target primary pulley speeds when changing the gear ratio.

According to the above structure, in the present invention, when the gear ratio is changed, for example, from 0.5 to 0.7 at point A in FIG. 10, a control gain is controlled to be small by the control gain changing means, while the speed deviation is large. On the other hand, when the gear is changed at point B, the control gain is changed to get larger since the deviation of the pulley speed is smaller than that of point A. As a result, since the feedback-control value obtained by multiplying the deviation of the pulley speed to the control gain are equal at points A and B in FIG. 10, a substantial control gain is equal even the deviation of pulley speed is different from each other and accordingly, a constant speed for changing gear ratio can be maintained by the equal substantial control gain, even the speed deviation is different.

Moreover, in case of the large speed deviation, since the feedback-control value is not too large but suitable, the hunting of the primary pulley speed occurred around the target speed can be prevented.

In the above description, although the control gain is changed directly according to the speed deviation, the control gain can be changed only by the primary pulley speed, or only by the secondary pulley speed, or by the both pulleys speed since the speed deviation changes according to the actual and the target primary pulley speed and the actual secondary pulley speed.

The above object and features of the present invention will be more apparent with the description of the prefered embodiment with reference to the accompanying drawings.

BRIEF DESCRIPTION OF THE DRAWING

The accompanying drawings show the preferred embodiment, in which.

DESCRIPTION OF THE PREFERRED EMBODIMENT

The preferred embodiment is described below with reference to the accompanying drawings.

Figure 1:
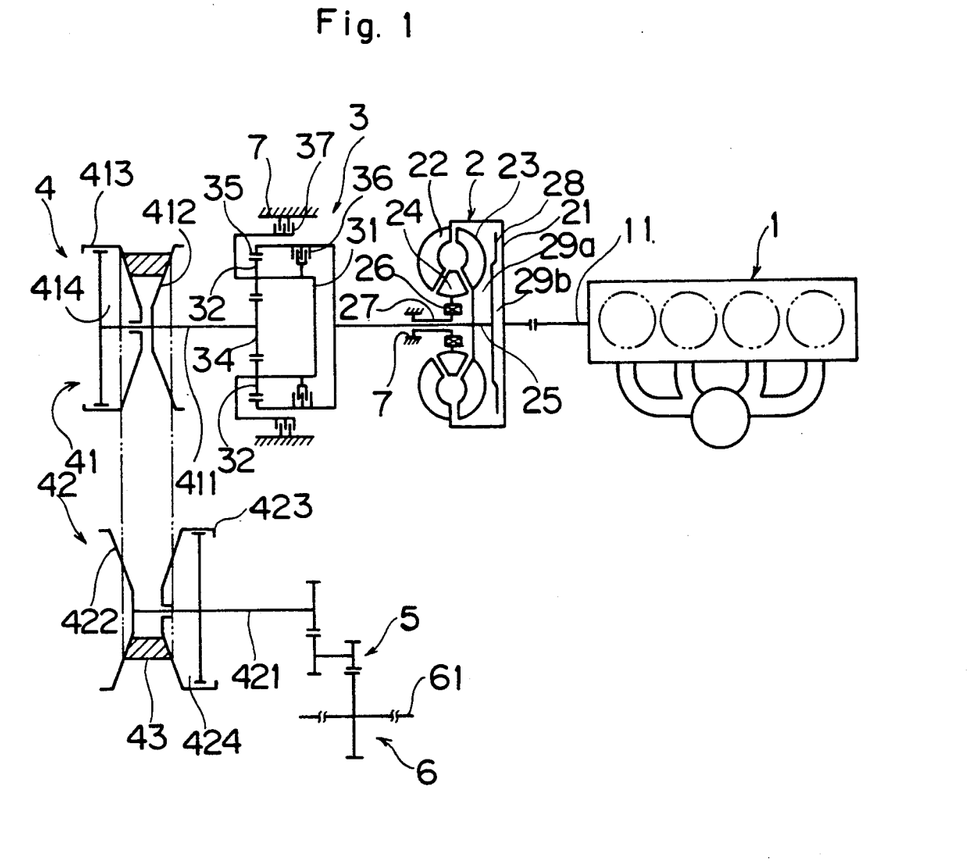
FIG. 1 is a schematic diagrammatical illustration of a continuous transmission.

FIG. 1 is a schematic diagrammatical illustration of a continuous transmission. A continuous transmission is basically composed of a torque converter 2 connected to an output shaft 11 of an engine 1, a forward/reverse shift unit 3, a continuous transmission unit 4, a decelerating unit 5, and a differential unit 6.

The above torque converter 2 comprises a pump cover 21 connected to an engine output shaft 11, a pump impeller 22 fixed to one end of the pump cover 21 in order to rotate integrally with an engine output shaft 11, a turbine runner 23 pivotably fitted inside the pump cover 21 and face to the pump impeller 22, a stator 24 interposed between the turbine runner 23 and the pump impeller 22 in order to multiply the torque, and a turbine shaft 25 fixed to the turbine runner 23. The above stator 24 is connected to a transmission case 7 through a one way clutch 26 and a stator shaft 27. Between above the turbine runner 23 and the pump cover 21, a lockup piston 28 is fixed slidably to the turbine shaft 25 so that the lockup piston 28 is connected/disconnected to the pump cover 21 by providing/releasing the hydraulic pressure between a lockup clutch lockup chamber 29a and a lockup clutch release chamber 29b, each formed in each side of the lockup piston 28.

The above forward/reverse shift unit comprises a carrier 31, pinion gears 32 supported by a carrier 31, a sungear 34 in mesh with the pinion gear 32 by being splined to a primary shaft 411 of a later described continuous transmission unit, and a ring gear 35 in mesh with the pinion gear 32. A ring gear 35 is splined to the turbine shaft 25 of the torque converter 2. Between the above ring gear 35 and the carrier 31, a forwarding clutch 36 which connects or disconnects the ring gear 35 and the carrier 31 is provided, and a reversing brake 37 which fixes the carrier 31 to the transmission case 7 is provided between the carrier 31 and the transmission case 7. By this structure, when the forwarding clutch 36 is fastened and the reversing brake 37 is released, the ring gear 35 and the carrier 31 are connected each other in order to rotate integrally so that the rotation of the turbine shaft 25 is transmitted to the primary shaft 411 of the continuous transmission unit 4. On the other hand, when the reversing brake 37 is fastened and the forwarding clutch 36 is released, the carrier 31 is fixed unrevolvably to the transmission case 7 in order to transmit the rotation of the ring gear 35 to a sungear 34 through the pinion gear 32. This transmitted rotation is again transmitted to the primary shaft 411 of the continuous transmission unit 4 by reversing the rotation of the turbine shaft 25. When both the forwarding clutch 36 and the reversing brake 37 are released together, the driving force of the engine is not transmitted from the turbine shaft 25 to the primary shaft 411 of the continuous transmission unit 4 (neutral and parking range).

The above continuous transmission unit 4 is composed of a primary pulley 41, a secondary pulley 42, and a V-belt 43 coupling the pulleys 41 and 42 rotatably.

The primary pulley 41 comprises the primary shaft 411 provided coaxially with the turbine shaft 25, a stationary pulley disc 412 having a frustoconical configuration fixed to the primary shaft 411, and a movable pulley disc 413 having a frustoconical configuration supported slidably by the primary shaft 411. Discs 412 and 413 are arranged in face-to-face fashion. When the movable pulley disc 413 slides, the V-belt holding position of the pulleys moves and accordingly, the effective diameter (effective pitch diameter) also varies. In this way, the effective pitch diameter becomes large when the movable pulley disc 413 is closer to the stationary pulley disc 412, and the effective pitch diameter becomes smaller when the movable pulley disc 413 is away from the stationary pulley disc 412.

The secondary pulley 42 is substantially identical in structure with the primary pulley 41. In short, the secondary pulley 42 comprises a secondary shaft 421 which is parallel to the primary shaft 411, a stationary pulley disc 422 having a frustoconical configuration fixed to a secondary shaft 421, and a movable pulley disc 423 having a frustoconical configuration supported slidably by the secondary shaft 421. The effective diameter varies according to the position of the movable pulley disc 423.

On the back of the each movably pulley discs 413, 423 of the pulleys 41, 42, each hydraulic cylinder 414, 424 for sliding the movable pulley disc 413, 423 is provided respectively. The area of receiving pressure in the hydraulic cylinder 414 of the primary pulley 41 is set about twice as much as that of the hydraulic cylinder 424 of the secondary pulley 42. The hydraulic pressure is provided/released into/from the hydraulic cylinder 414 of the primary pulley 41 in order to change the gear ratio between the both pulleys 41, 42, and the hydraulic pressure is provided/released into/from the hydraulic cylinder 424 of the secondary pulley 2 in order to maintain the appropriate tension of the V-bent 43. When the hydraulic pressure is provided into the hydraulic cylinder 414 of the primary pulley 41, the V-belt holding position on the primary pulley 41 slides outwardly and the effective pitch diameter of the primary pulley 41 increases. According to this, the V-belt holding position on the secondary pulley 42 slides inwardly and the effective pitch diameter of the secondary pulley decreases. Thus, the gear ratio between the primary shaft 411 and the secondary shaft 421 decreases (to the acceleration direction).

On the contrary, when the hydraulic pressure is released from the hydraulic cylinder 414, the effective pitch diameter of the primary pulley 41 decreases and the effective pitch diameter of the secondary pulley increases. Thus, the gear ratio between the primary shaft 411 and the secondary shaft 421 increases (to the deceleration direction).

The structure of the decelerating unit 5 and a differential unit 6 have been known and they transmit the rotation of the secondary shaft 421 to the vehicle shaft 61.

A hydraulic circuit to control the above mentioned operation of the lockup piston 28 of the torque converter 2 in the continuous transmission, of the forwarding clutch 36 and the reversing clutch 37 in the forward-/reverse shift unit 3, and of the primary pulley 41 and the secondary pulley 42 in the continuous transmission unit, will be described below with referrence to FIG. 2.

Figure 2:
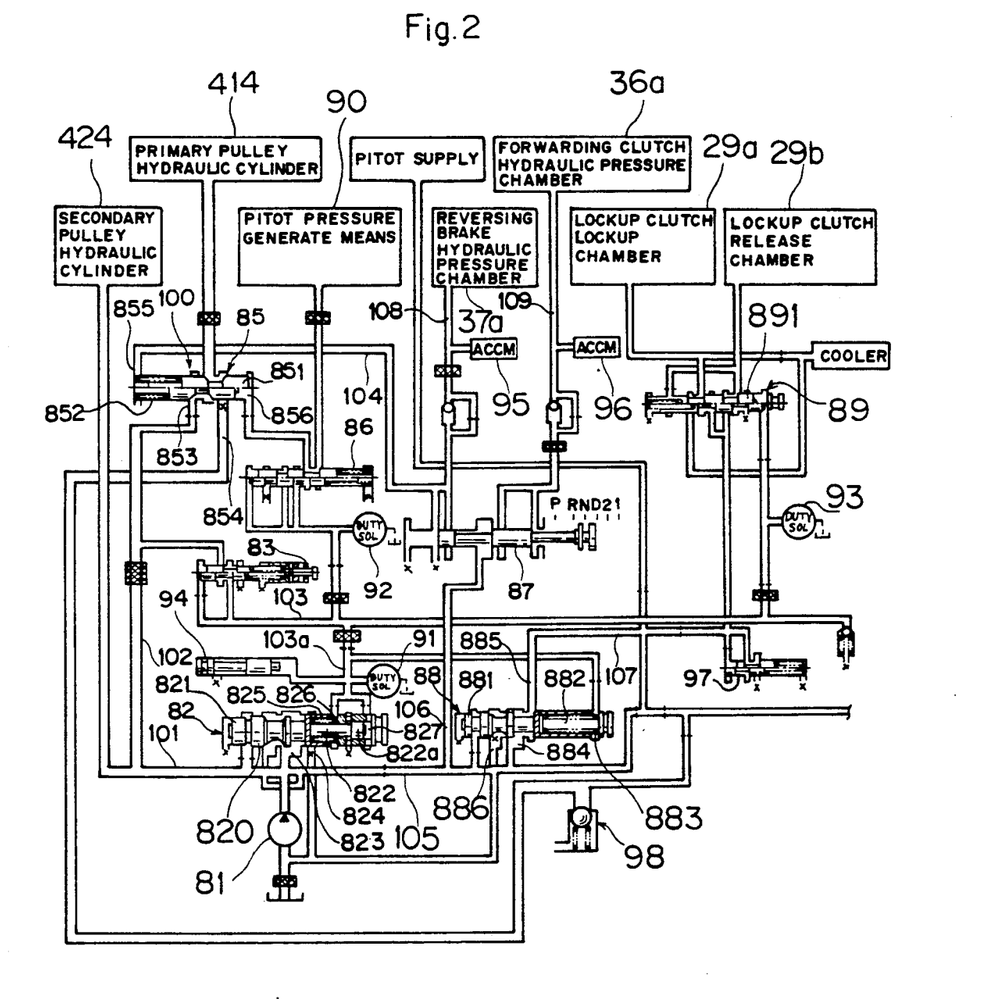
FIG. 2 is a diagrammatic illustration of a hydraulic control circuit.

The hydraulic circuit in FIG. 2 comprises an oil pump 81 driven by an engine 1. The transmission fluid pumped out from the oil pump 81 is regulated to a determined line pressure at the line pressure regulator valve 82, then flows to the hydraulic cylinder 424 of the secondary pulley 42 through a pressure line 101, and finally flows into the hydraulic cylinder 414 of the primary pulley 41 through a pressure line 102 which is diverged from the pressure line 101.

The above line pressure regulator valve 82 comprises a spool 820 composed a principle spool 821 and a complementary spool 822 arranged in series. The one end of the principle spool 821 is connected to the one end of the complementary spool 822. On the another end of the complementary spool 822, provided is a large diameter part 822a having larger sectional area than the connecting area (a sectional area of connection) of the complementary spool 822 to the principle spool 821. A pressure regulator port 823 whereto the transmission fluid from the oil pump 81 flows, and a drain port 824 connected to the suction side of the oil pump 81, are provided at a corresponding position to the center of the principle spool 821. When the principle spool 821 slides to the left as viewed in FIG. 2, the pressure regulator port 823 and the drain port 824 are disconnected, and when the principle port 821 slides to the right in the drawing, the pressure regulator port 823 and the drain port 824 are connected. A first pilot chamber 825 is formed at a corresponding position to the connecting part of the principle spool 821 with the complementary spool 822. A spring 826 is provided in the first pilot chamber 825 to urge the principle spool 821 to the left in FIG. 2. A second pilot chamber 827 communicating the the first pilot chamber 825 is formed in the large diameter part 822a of the complementary spool 822. The pressure of transmission fluid is reduced to a fixed degree by a reducing valve 83 during the transmission fluid goes through a presure line 103 after going through the pressure line 102. Then the transmission fluid flows into both the first pilot chamber 825 and the second pilot chamber 827 as a pilot pressure regulated by a first duty solenoid valve 91 during going through a pilot passage 103a. While this pilot pressure urges to the same direction as the spring 826, the hydraulic pressure inside the pressure line 101 urges at the another end of the principle spool 821 against the pilot pressure and the urging force of the spring. By the relationship of the pilot pressure, the urging force of the spring and the hydraulic pressure inside the pressure line, the spool 820 slide so as to connect or disconnect a pressure regulator port 823 and a drain port 824. Thus, the line pressure is controlled to correspond to the pilot pressure regulated by a first duty solenoid valve 91.

On the above pressure line 102, a gear ratio control valve 85 is provided. This gear ratio control valve 85 comprises a spool 851, a spring 852 urging the spool 851 to the right in the drawing, a line pressure port 853 connected to the upper stream part of the line 102, a drain port 854, a reverse port 855 which opens on the spring 852 side and connected to a select valve 87 through a pressure line 104, and a pilot chamber 856 formed in the opposite side of the spring 852 so as to the pilot pressure flows thereinto. Through a pitot valve 86, the pilot chamber 856 is connected to a second duty solenoid valve 92 and a pitot pressure generate means 90 which generates pitot pressure corresponding to speed of the engine 1. Accordingly, the pitot pressure generated by a pitot generate means 90 and the pressure regulated by the second duty solenoid valve 92 can flow into the pilot selectively by the pitot valve 86 as pilot pressure. Thus, even if the second duty solenoid valve 92 is in trouble, the pitot pressure can flow to the pitot chamber 856 from the pitot generate means 90 as pitot pressure.

In the gear ratio control valve 85, since the hydraulic pressure is drained from the reverse port 855 through the select valve 87 in case of forwarding (the select valve 87 is positioned either D,2, or 1), the spool 851 slides according to the relationship between the pilot pressure flew into the pilot chamber 856 and the urging force of the spring 852. Thus, the hydraulic cylinder 414 of the primary pulley 41 connects either the line pressure port 853 or the drain port 854. In this way, a regulator means 100 regulator the effective pitch diameter of the primary pulley 41 and the secondary pulley 42 of the continuous transmission unit 4 by providing/releasing control of the hydraulic pressure of the primary pulley 41 to/from the hydraulic cylinder 414 according to the pilot pressure flowing into the pilot chamber 856 at forwarding.

On the other hand, when reversing (the select valve 87 is shifted to R range), the hydraulic pressure (the pressure described later) is provided to the gear ratio control valve 85 from a reverse port 855. By this pressure, the spool 851 is urged to the right in FIG. 2 and fixed there. Thus, when reversing, the hydraulic cylinder 414 of the primary pulley 41 and the drain port 854 are connected at all times, and the gear ratio is maintained at its maximum.

This latter example can be also applied to a case of the neutral and parking range (the select valve 87 is shifted to N or P range) which the driving force of the engine 1 is not transmitted to the vehicle shaft 61 by the forward/reverse shift unit 3.

The transmission fluid regulated by the line pressure regulator valve 82 is pumped out to a pressure line 105 other than the pressure line 101. The transmission fluid pumped out to the pressure line 105 flows to pressure lines 106 and 107 after being regulated to a fixed transmission fluid pressure by a transmission fluid regulator valve 88.

The transmission fluid pressure regulator valve 88 comprises a spool 881, a pilot chamber 882 formed in one side of the spool 881, a spring 883 provided inside the pilot chamber 882, a first pressure regulator port 884 connected to the pressure line 105, a second pressure regulator port 885 connected to the pressure line 107, and a drain port 886. The pilot chamber 882 is connected to a first duty solenoid valve 91 through a pilot passage 103a. Thus, the transmission fluid regulated at the first duty solenoid valve 91 flows to the pilot chamber 882 as pilot pressure. While the pilot pressure urges to the same direction as the spring 883, the hydraulic pressure inside the pressure line 105 urges against the spring 883 and the pilot pressure at the another end of the spool 881. According to the relationship between the pilot pressure, a urging force of the spring 883, and a hydraulic pressure inside the pressure line 105, the spool 881 slides to connect or disconnect the first and a second pressure regulator port 884, 885 and a drain port 886. Through this movement, the transmission fluid pressure of the forwarding clutch 36 and the reversing brake 37 is regulated to correspond to the pilot pressure which is regulated at the first duty solenoid valve 91.

When the select valve is shifted to D, 2, or 1 range, the transmission fluid supplied to the pressure line 106 flows into a hydraulic pressure chamber 36a of the forwarding clutch 36 of the forward/reverse shift unit 3 through a pressure line 109. On the other hand, when the select valve is shifted to a reverse range (R), the transmission fluid supplied to the line 106 flows into a hydraulic pressure chamber 37a of the reversing brake 37 of the forward/reverse shift unit 3 and it flows to a reverse port 855 of the gear ratio control valve 85 through the pressure line 104. The transmission fluid build up in the hydraulic pressure chamber 36a, 37a of the forwarding clutch 36 and the reversing brake 37 of the forward/reverse shift unit 3 is released through the pressure lines 109, 108 respectively when the select valve 87 is shifted to R, N, or P range. Accordingly, the forwarding clutch 36 and the reversing brake 37 both of the forward/reverse shift unit 3 are connected or disconnected each other according to the shifted position of the select valve 87, and the gear ratio of the continuous transmission unit 4 is maintained at its maximum at the R, N, or P range.

The transmission fluid supplied to the pressure line 107 flows to the lockup clutch lockup chamber 29a or the lockup clutch release chamber 29b of the torque converter 2 through a lockup control valve 89. The lockup control valve 89 is controlled by the pilot pressure by which a spool 891 is regulated at a third duty solenoid valve 93. When the above pilot pressure gets low, the spool 891 slides to the right in FIG. 2 so as to the transmission fluid flows into the lockup clutch lockup chamber 29a from the pressure line 107, and the transmission fluid in the lockup clutch release chamber 29b is drained. On the other hand, when the pilot hydraulic pressure gets high, the spool 891 slides to the left in FIG. 2, the transmission fluid flows into the lockup clutch release chamber 29b from the pressure line 107, and the transmission fluid in the lockup clutch lockup chamber 29a is drained.

A referrence numeral 94 designates an acume valve which prevents the pilot hydraulic pressure of the pilot passage 103a from shaking when switching the first duty solenoid valve 91 ON and OFF, referrence numerals 95, 96 designate accumulater for easing the shock at the moment of fastening the forwarding clutch 36 and the reversing brake 37 respectively, a referrence numeral 97 designates a relief valve, and a referrence numeral 98 designates a pressure maintain valve which maintains the hydraulic pressure at a fixed low level when the hydraulic pressure in the hydraulic cylinder 414 of the primary pulley 41 is drained.

Figure 3:
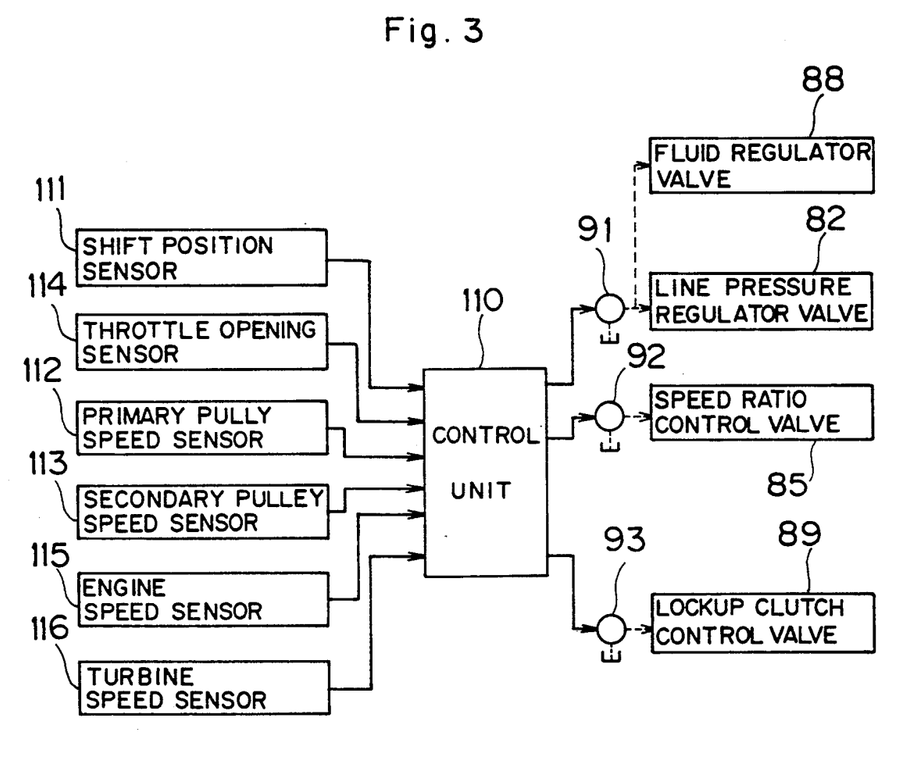
FIG. 3 is a block diagram showing a electric control system.

An electrical control circuit of the continuous transmission is shown in FIG. 3. A control unit 110 having a micro computer etc. receives outputs from various sensors such as a selected drive range sensor for detecting the operated position (D, 1, 2, R, N, or P) of the shift lever by a driver, a primary pulley speed sensor 112 for detecting speed np of the primary pulley 411 or an actual primary pulley speed as a speed detecting means, a secondary pulley speed sensor 113 for detecting the speed ns of the secondary pulley 421, a throttle opening sensor 114 for detecting the opening of an engine throttle TVO of an engine 1, an engine speed sensor 115 for detecting the speed Ne of the engine 1, and a turbine speed sensor 116 for detecting the speed Nt of the turbine of a turbine shaft 25 of the torque converter 2. A control unit 110, on the basis of the outputs of these sensors, controls the first to third duty solenoid valves 91, 92, 93. Thus, each the pilot hydraulic pressure supplied to a line pressure regulator valve 82, a transmission fluid regulator valve 88, a gear ratio control valve 85, and a lockup control valve 89 are controlled.

Figure 8:
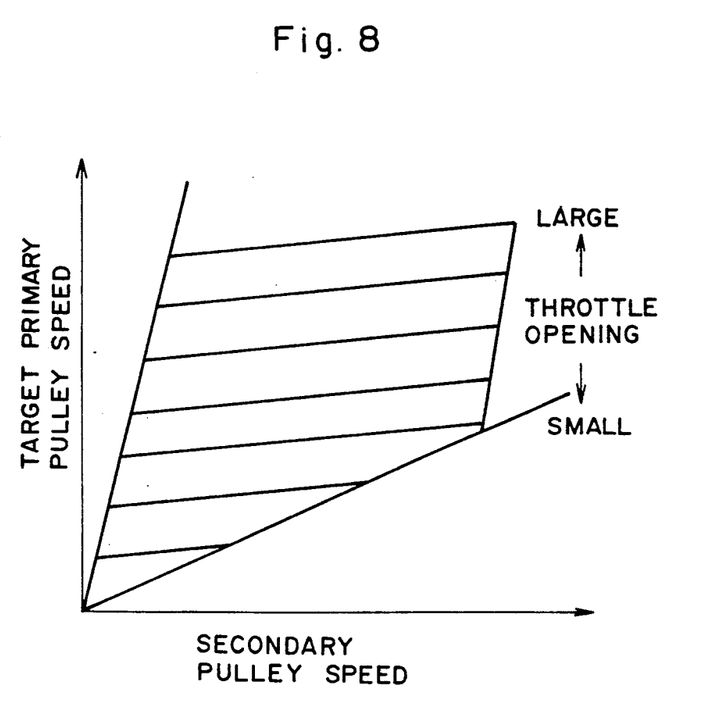
FIG. 8 is a characteristic diagram showing a target primary pulley speed.

The gear ratio control of the control unit 110 is described below with the control flow chart of FIG. 4. At step $S_{A1}$ an actual primary pulley speed np, an actual secondary pulley speed ns, and an opening TVO of the engine throttle are read. At step $S_{A2}$, on the basis of the above opening TVO of the throttle valve and the actual secondary pulley speed ns, a target speed of the primary pulley 41 (the target primary pulley speed) which corresponds to the target gear ratio is found from the map on FIG. 8, and at step $S_{A3}$ the deviation $\Delta n$ ($= np - np_0$) between the actual the primary pulley speed np and the target primary pulley speed $np_0$ is calculated.

At step $S_{A4}$, the parameter kc of the control gain is calculated by using the formula $kc = np_1/mp_0$, where $np_1$ is the primary pulley speed at the point of calculating the parameter.

Thereafter, at step $S_{A5}$, an integral coefficient Cint, a proportional coefficient Cprp, and a differential coefficient Cdef, those as feedback-control value, are calculated on the basis of the gains such as integral gain ki, proportional gain kp, and differential gain kd, and the deviation such as $\Delta n_i$, $\Delta n_{i-1}$, and parameter kc of the control gain by using the following formulas:

$$Cint = kc \cdot ki \cdot \Delta n_i$$

$$Cprp = kc \cdot kp \cdot (\Delta n_i = \Delta n_{i-1})$$

$$Cdef = kc \cdot kd \cdot (\Delta ni - 2 \cdot \Delta n_{i-1} + \Delta n_i)$$

At final step $S_{A6}$, the feedback-control value which is the total of the above coefficient Cint, Cprp, and Cdef is converted to a control duty ratio which corresponds to a second duty solenoid valve 92 used for the gear ratio control valve 85. The second duty solenoid valve 92 is controlled by the control duty ratio signal.

Figure 4:
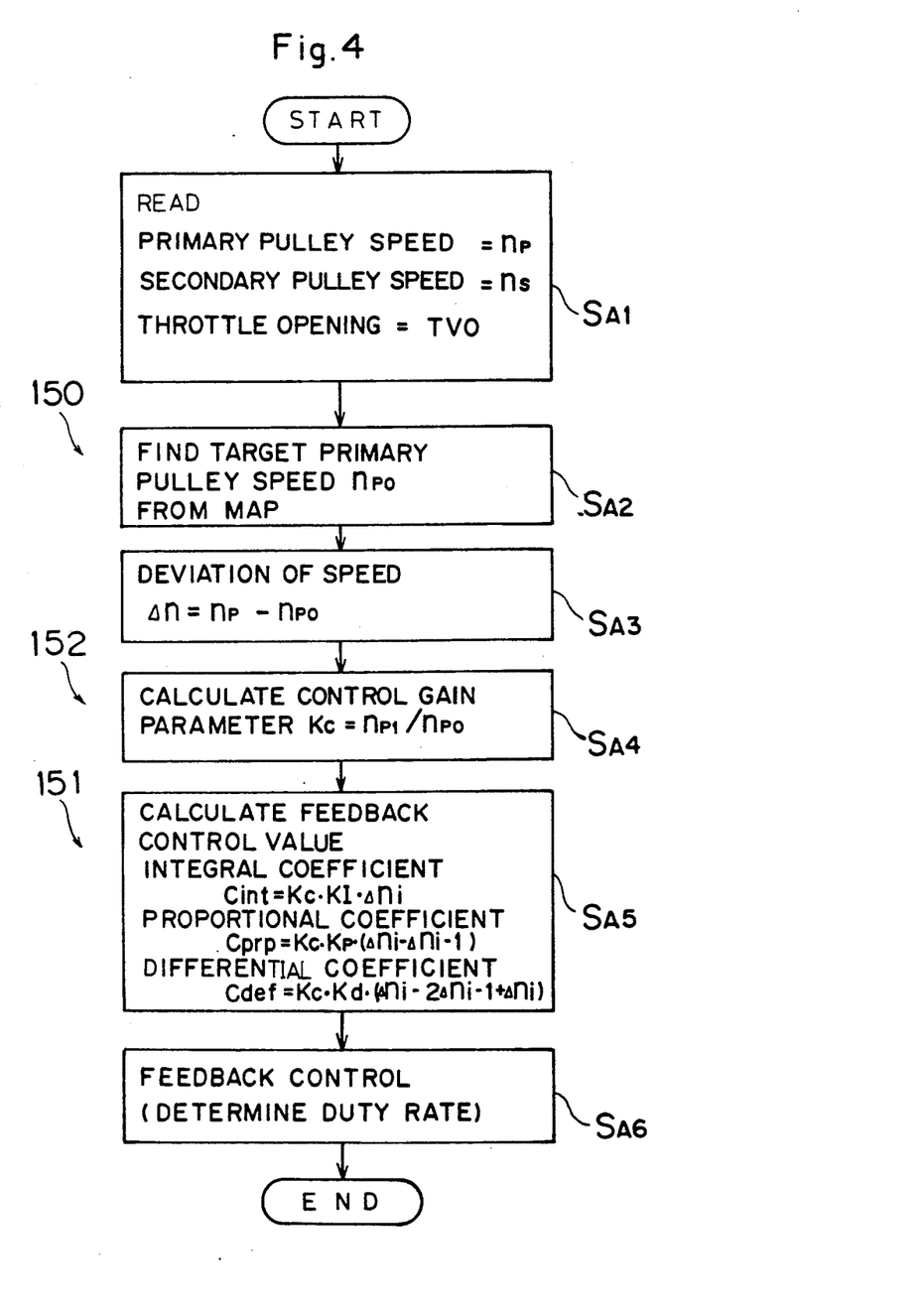
FIGS. 4 and 5 are flow charts showing a gear ratio control.

Thus, as shown the gear ratio control flow chart of FIG. 4, at step $S_{A2}$ formed is a target speed establish means 150 for establishing the target speed $np_0$ of the primary pulley 41 corresponding to the target gear ratio which is determined by the driving status. This driving status varies depending on the opening TVO of the throttle valve and the actual speed ns of the secondary pulley. Also, control means 151, which receives outputs of target speed establish means 150 and a primary pulley speed sensor 112, is formed at steps $S_{A3}$, $S_{A5}$, and $S_{A6}$ of the control flow chart. The control means 151 feedback-controls the second duty solenoid valve 92 used for the gear ratio control valve 85 of the control means 100 so that the actual speed np of the primary pulley 41 is controlled to the target speed $np_0$ on the basis of the deviation $\Delta n$ ($=np-np_0$) between the actual speed np and the target speed $np_0$ of the primary pulley 41.

Moreover, control gain change means 152 converts the control gains of the control means 151 such as the integral gain ki, a proportional gain kp, and the differential gain kd in inverse proportion to the target speed $np_0$, i.e. the deviation $\Delta n$ is formed at steps $S_{A4}$ and $S_{A5}$ of the control flow chart. For example, as shown in FIG. 10, when a gear ratio is changed by the same amount, the higher the target speed $np_0$ becomes, i.e. the greater speed deviation $\Delta n$, the lesser the gains become, since the higher target primary pulley speed has larger deviation $\Delta n$ between the target speed $np_0$ and the actual speed np.

In this embodiment, when the gear ratios at points A and B in FIG. 10 are converted from 0.5 to 0.7, the deviation of the speed $\Delta n$ ($=np-no_0$) is great at point A and little at point B. However, the parameter kc at point A having higher target primary pulley speed $np_0$ is less than that of point B having lower target primary pulley speed $np_0$, since the target speed $np_0$ and the parameter kc are in inverse proportion, which means the higher target primary pulley speed $np_0$ becomes, the lesser the parameter kc gets. As a result, when the gear ratio is changed by the same amount, the constant speed for changing the gear ratio is gained in spite of the target primary pulley speed np since the constant feedback-control value calculated by the deviation $\Delta n$ of the speed multiplied by the coefficient kc is maintained.

Moreover, at point A, even the speed deviation $\Delta n$ is great, the control gain ki, kp, kd of integration, proportion and differentiation respectively are multiplied by the parameter kc and corrected to be little so as to get the suitable feedback-control value. Consequently, the primary pulley speed np can become the target speed $np_0$ smoothly without hunting.

The example for changing the gear ratio from 0.5 to 0.7 is described above and it will be understood that the other cases such as changing the gear ratio from 1.8 to 2.0 etc. can gain the same speed for changing the gear ratio as described above.

Figure 5:
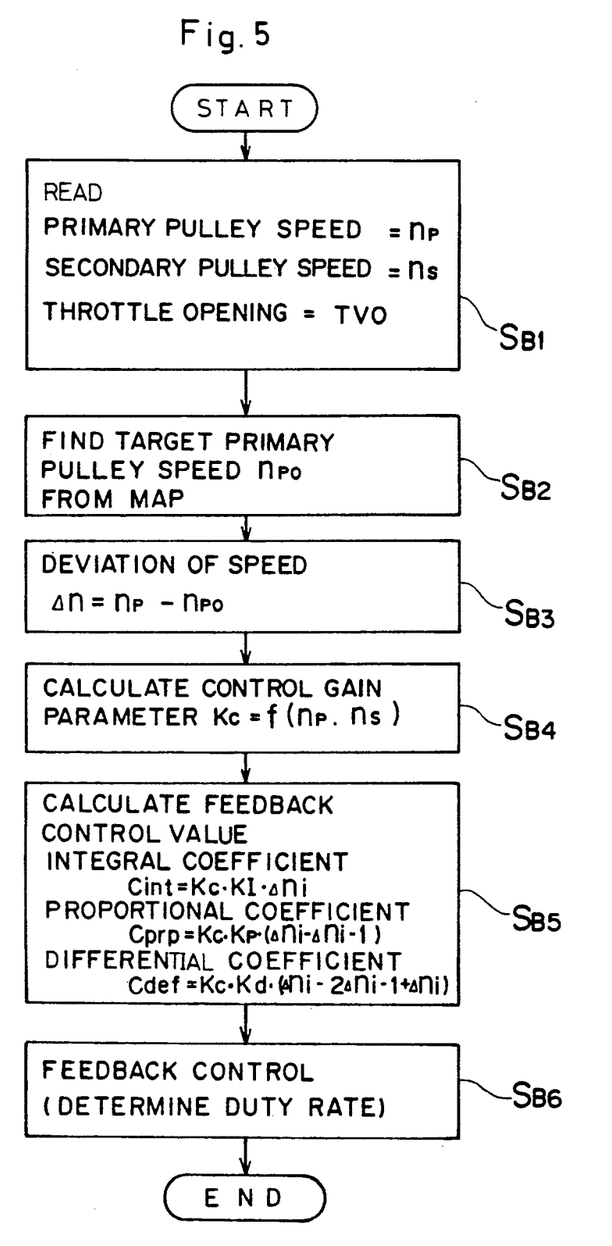
Figure 6:
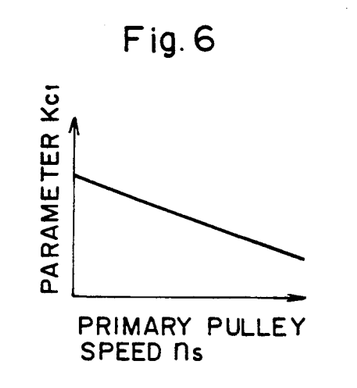
FIGS. 6 and 7 are characteristic diagrams showing a parameter of a feedback-control gain corresponding to a primary and the secondary pullely speed respectively.
Figure 7:
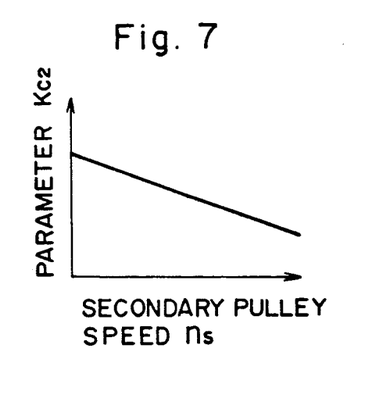
Figure 9:
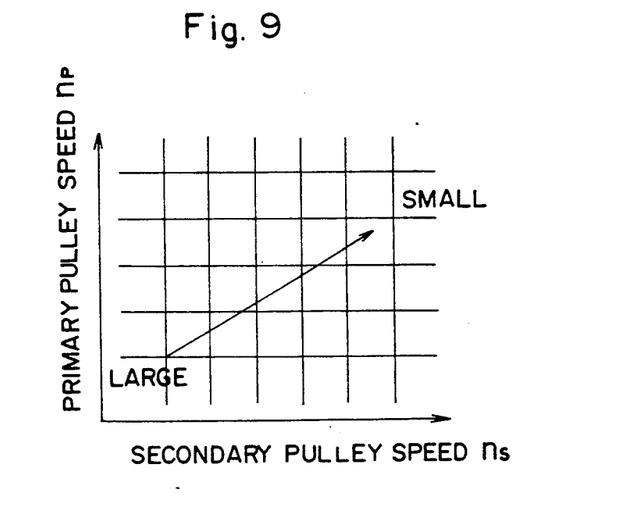
FIG. 9 is a diagram showing a map of parameter of a feedback control gain.

FIG. 5 shows the gear ratio control flow chart for calculating the parameter kc based on both the actual primary pulley speed np and the actual secondary pulley speed ns. Only the step $S_{B4}$ in FIG. 5 is different from FIG. 4. In this step $S_{B4}$ as shown in FIG. 6, the higher actual primary pulley speed np becomes, the smaller the coefficient $kc_1$ becomes. Also as shown in FIG. 7, the higher the actual the secondary pulley speed ns is, the smaller the coefficient $kc_2$ becomes. Thereafter parameter kc is gained by multiplying the coefficient $kc_1$ to the coefficient $kc_2$. This coefficient kc can be small when both the primary pulley speed np and the secondary pulley speed ns are high according to a map in FIG. 9.

In the present embodiment, the parameter kc for the control gain changes according to the actual secondary pulley speed ns in addition to the actual primary pulley speed np. When the actual secondary pulley speed ns is high (high driving speed), the parameter kc gets low. At point A in FIG. 10, the gear ratio is changed from 0.5 to 0.7, and at point C in FIG. 10 the gear ratio is changed from 1.8 to 2.0. Both points have the same actual primary pulley speed np 2500 r.p.m. However, while the speed deviation $\Delta N$ is large at point A and small at point C, the parameter kc is smaller at point A than at point C since the actual secondary pulley speed ns is lower at point A than at point C. Thus, the feedback-control value is equal at points A and C, and the same speed for changing the gear ratio can be gained at both points A and C.

What is claim is:

1. A speed shift control system of a continuous transmission having a primary and secondary pulley, a belt rotatably coupling said pulleys, and a regulator means for regulating an effective diameter of said primary pulley and said secondary pulley, said continuous transmission comprising:

target speed determining means for determining a target primary pulley speed corresponding to a target gear ratio which varies according to a driving status;

actual speed detecting means for detecting an actual speed of said primary pulley;

control means for feedback-controlling said regulator means by a control gain so that the primary pulley speed is controlled to said target primary pulley speed on the basis of a speed deviation between said target primary pulley speed and said actual primary pulley speed obtained by said target speed determining means and said actual speed detecting means; and control gain changing means for changing control gains of said control means according to at least said deviation between said target primary pulley speed and said actual primary pulley speed wherein said control gain is inversely proportional to said deviation.

2. A speed shift control system of a continuous transmission as claimed in claim 1, wherein said primary and secondary pulley comprises a hydraulic cylinder, and an area for receiving a transmission fluid pressure in said primary pulley is larger than an area for receiving the transmission fluid pressure in said secondary pulley.

3. A speed shift control system of a continuous transmission as claimed in claim 2, wherein said regulator means comprises a gear ratio control valve for supplying a hydraulic pressure to and releasing a hydraulic pressure from said hydraulic cylinder of said primary pulley, and a duty solenoid valve for controlling sliding of a spool of said gear ratio control valve.

4. A speed shift control system of a continuous transmission as claimed in claim 1, wherein said target speed determining means sets a higher target primary pulley speed as an opening of an engine throttle valve gets large.

5. A speed shift control system of a continuous transmission as claimed in claim 1, wherein said control gains of said control means are an integral gain, a proportional gain, and a differential gain.

6. A speed shift control system of a continuous transmission as claimed in claim 1, wherein said control gain changing means changes a control gain of said control means according to a primary pulley speed.

7. A speed shift control system of a continuous transmission as claimed in claim 1, wherein said control gain changing means changes a control gain of said control means according to a secondary pulley speed.

8. A speed shift control system of a continuous transmission as claimed in claim 1, wherein said control gain changing means changes a control gain of said control means in inverse proportion to at least one of said actual primary pulley speed and an actual secondary pulley speed.

9. A speed shift control system of a continuous transmission as claimed in claim 8, wherein said control gain changing means calculates a parameter of control gain(s) which is obtained by multiplying a coefficient which is in inverse proportion to said actual primary pulley speed to a coefficient which is in inverse proportion to said actual secondary pulley speed.

10. A speed shift control system of a continuous transmission as claimed in claim 1, wherein said control gain changing means changes a control gain of said control means in inverse proportion to at least one of said target primary pulley speed and a target secondary pulley speed.

11. A speed shift control system of a continuous transmission as claimed in claim 10, wherein said control gain changing means calculates a parameter of control gain(s) which is obtained by dividing said actual primary pulley speed $np_1$ and calculating the parameter by said target primary pulley speed $np_0$ ($np_1/np_0$).

* * * * *